(12) United States Patent
Oh

(10) Patent No.: US 12,292,159 B2
(45) Date of Patent: May 6, 2025

(54) BETWEEN-STUD BRACKET WITH AUTO-HEIGHT SYSTEM

(71) Applicant: ERICO International Corporation, Solon, OH (US)

(72) Inventor: Michael Hung Sun Oh, Twinsburg, OH (US)

(73) Assignee: ERICO International Corporation, Solon, OH (US)

( * ) Notice: Subject to any disclaimer, the term of this patent is extended or adjusted under 35 U.S.C. 154(b) by 315 days.

(21) Appl. No.: 17/980,877

(22) Filed: Nov. 4, 2022

(65) Prior Publication Data

US 2023/0135614 A1 May 4, 2023

Related U.S. Application Data

(60) Provisional application No. 63/275,645, filed on Nov. 4, 2021.

(51) Int. Cl.
*F16M 13/02* (2006.01)
*H02G 3/08* (2006.01)

(52) U.S. Cl.
CPC ............. *F16M 13/02* (2013.01); *H02G 3/08* (2013.01)

(58) Field of Classification Search
CPC ........... F16M 13/02; H02G 3/08; H02G 3/125
USPC ...................................................... 248/200.1
See application file for complete search history.

(56) References Cited

U.S. PATENT DOCUMENTS

| | | | | |
|---|---|---|---|---|
| 1,288,024 | A | * | 12/1918 | Kendig ................. H02G 3/125 220/3.9 |
| 5,386,959 | A | * | 2/1995 | Laughlin ............... H02G 3/125 248/200.1 |
| 6,484,979 | B1 | | 11/2002 | Medlin, Jr. |
| 6,484,980 | B2 | | 11/2002 | Medlin, Sr. et al. |
| 6,573,449 | B2 | | 6/2003 | Vrame |
| 6,590,155 | B2 | | 7/2003 | Vrame et al. |
| 6,666,419 | B1 | | 12/2003 | Vrame |
| 6,723,918 | B2 | | 4/2004 | Vrame |
| 6,803,521 | B2 | | 10/2004 | Vrame |
| 7,036,782 | B2 | | 5/2006 | Cheatham et al. |
| 7,271,335 | B2 | | 9/2007 | Dinh |
| 7,271,336 | B2 | | 9/2007 | Dinh |
| 7,521,631 | B2 | | 4/2009 | Dinh |
| 7,956,285 | B2 | | 6/2011 | Tally et al. |
| 9,397,491 | B2 | | 7/2016 | Birli et al. |
| 9,444,236 | B2 | | 9/2016 | Witherbee |
| 9,564,744 | B2 | | 2/2017 | Jaffari et al. |
| 9,653,899 | B2 | | 5/2017 | Salian et al. |
| 9,780,545 | B2 | | 10/2017 | Witherbee |
| 10,077,866 | B2 | | 9/2018 | Witherbee |

(Continued)

FOREIGN PATENT DOCUMENTS

| CA | 2586301 A1 | 2/2008 |
|---|---|---|
| CA | 2582945 C | 6/2009 |

(Continued)

*Primary Examiner* — Todd M Epps
(74) *Attorney, Agent, or Firm* — Quarles & Brady LLP

(57) ABSTRACT

A bracket can be provided to support objects between studs. A pivot tab on the bracket can support the bracket relative to a stud as the bracket pivots from a vertical installation orientation to a horizontal support orientation. The bracket can engage a floor track when in the vertical orientation to align the bracket for installation at a predetermined height.

20 Claims, 9 Drawing Sheets

(56) References Cited

U.S. PATENT DOCUMENTS

| | | |
|---|---|---|
| 10,084,298 B2 | 9/2018 | Terwilleger |
| 10,711,940 B2 | 7/2020 | Witherbee |
| 10,784,666 B2 | 9/2020 | Korcz et al. |
| 10,851,937 B2 | 12/2020 | Johnson et al. |
| 10,958,053 B2 | 3/2021 | Korcz et al. |
| 10,965,071 B1 * | 3/2021 | Johnson ................ H02G 3/125 |
| 11,248,721 B2 | 2/2022 | Oh |
| 11,585,486 B2 | 2/2023 | Witherbee et al. |
| 2005/0067546 A1 | 3/2005 | Dinh |
| 2010/0006723 A1 | 1/2010 | Yan |
| 2010/0078532 A1 | 4/2010 | Whipple et al. |
| 2010/0176138 A1 | 7/2010 | Zacharevitz et al. |
| 2016/0099555 A1 | 4/2016 | Nikayin et al. |
| 2016/0330863 A1 | 11/2016 | Birli et al. |
| 2020/0378553 A1 | 12/2020 | Oh et al. |
| 2021/0006055 A1 | 1/2021 | Korcz et al. |
| 2021/0025543 A1 | 1/2021 | Witherbee |
| 2021/0041059 A1 | 2/2021 | Witherbee et al. |

FOREIGN PATENT DOCUMENTS

| | | |
|---|---|---|
| CA | 2855286 C | 12/2014 |
| WO | 2009/015041 A2 | 1/2009 |
| WO | 2010/008778 A2 | 1/2010 |

\* cited by examiner

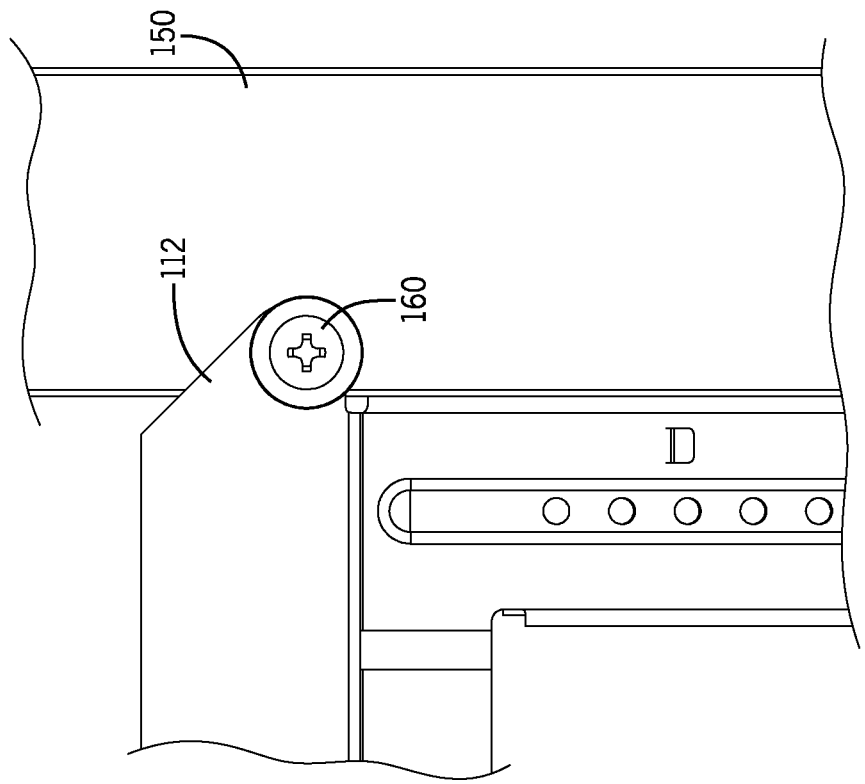
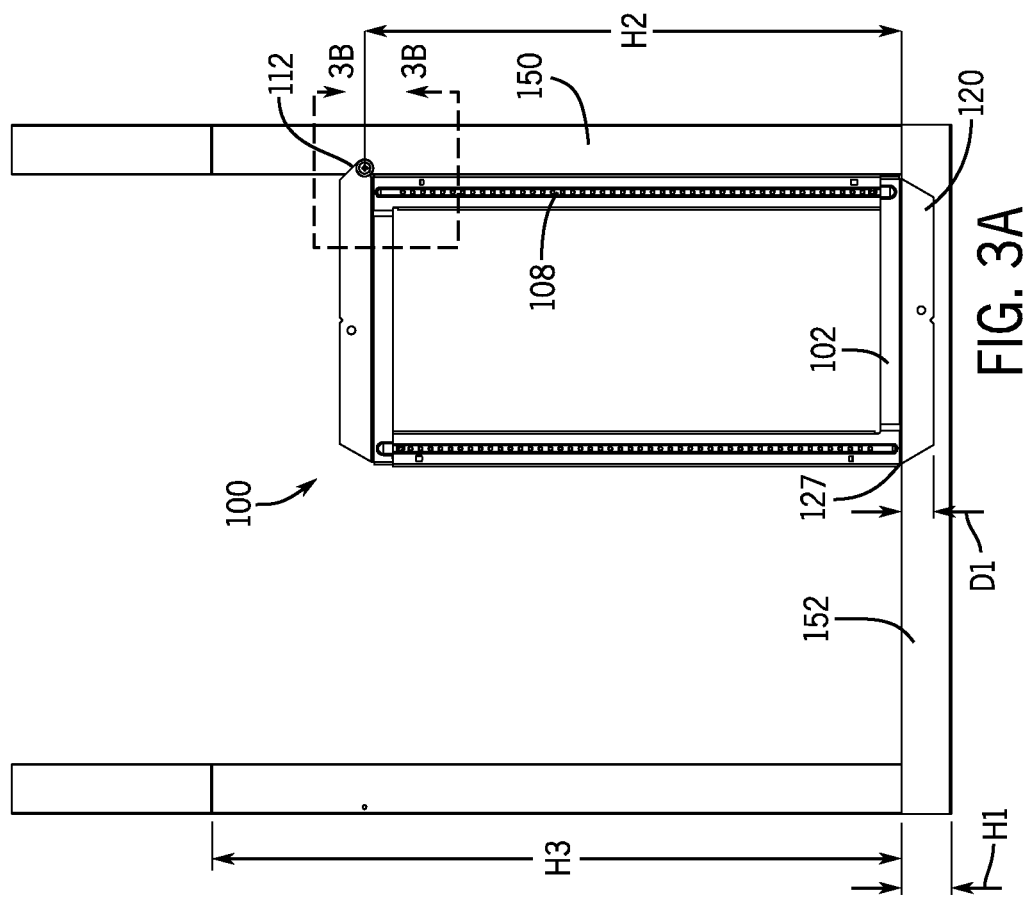
FIG. 3B
FIG. 3A

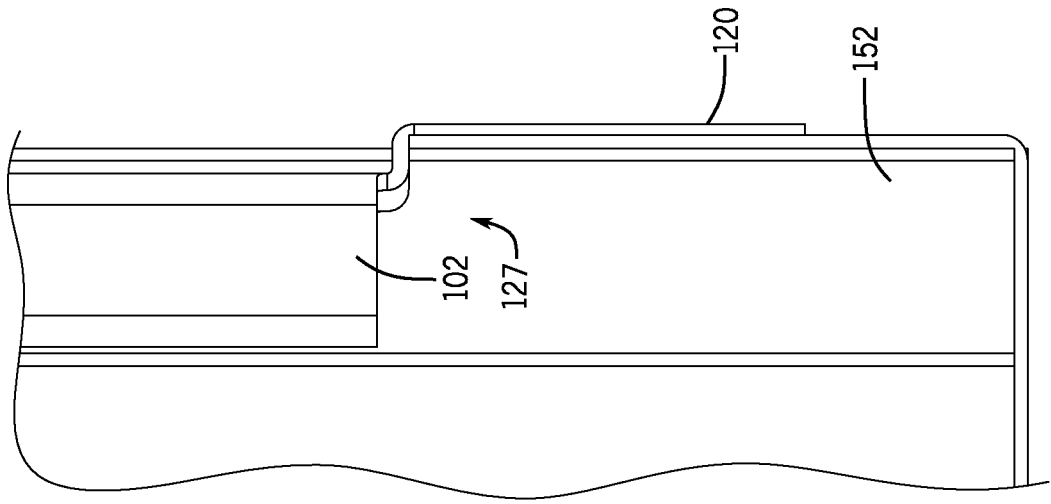
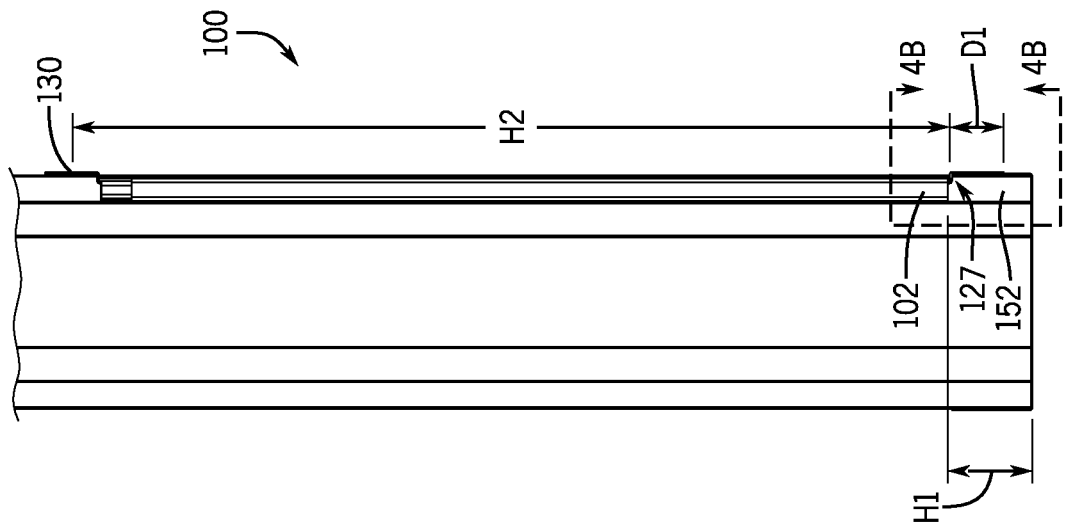
FIG. 4A
FIG. 4B

BETWEEN-STUD BRACKET WITH AUTO-HEIGHT SYSTEM

CROSS-REFERENCE TO RELATED APPLICATIONS

This application claims priority to U.S. Provisional Patent Application No. 63/275,645, filed Nov. 4, 2021, the entirety of which is incorporated herein by reference.

BACKGROUND

In some contexts, it may be useful to support electrical boxes or other objects relative to building structures. In some installations, telescoping electrical brackets can be used to support electrical boxes or other objects in a space between adjacent studs.

SUMMARY

Embodiments of the invention can provide improved brackets for supporting electrical boxes or other equipment between studs. In some embodiments. a method of installing a telescoping bracket system can be provided to support an object in a stud cavity between a first stud and a second stud. A bracket that includes telescoping rails that extend between first and second mounting flanges can be arranged in an installation orientation. In the installation orientation the bracket can extend substantially vertically along the first stud and a shoulder of the bracket that is adjacent to the second mounting flange rests on a floor track that extends between the first stud and the second stud. The bracket can be secured to the first stud in the installation orientation with a first fastener received through a pivot opening on a pivot tab that extends integrally from the first mounting flange. With the bracket secured to the first stud at the pivot opening, the bracket can be pivoted from the installation orientation to a support orientation. The telescoping rails can be extended so that the bracket extends substantially horizontally to span the stud cavity, with the first mounting flange overlaying the first stud and the second mounting flange overlaying the second stud. The bracket can be secured to the second stud with a second fastener received through the mounting opening.

In some embodiments, a telescoping bracket system can be provided, which can include a bracket. The bracket can include a first mounting flange, a second mounting flange, telescoping rails, and a pivot tab. The second mounting flange can include a mounting opening. The telescoping rails can extend between the first and second mounting flanges. The pivot tab can extend integrally from the first mounting flange and can include a pivot opening arranged to secure the bracket to a first stud to be pivotable between a substantially vertical installation orientation of the telescoping bracket system and a substantially horizontal support orientation of the telescoping bracket system. In the installation orientation, the bracket can be secured to the first stud at the pivot opening and can extend along the first stud so that a shoulder of the bracket that is adjacent to the second mounting flange rests on a floor track that extends along a floor between the first stud and a second stud. In the support orientation, the first mounting flange can overlay the first stud and the second mounting flange can overlay the second stud, with the bracket secured to the first stud at the pivot opening and to the second stud at the mounting opening to span a stud cavity between the first stud and the second stud.

In some embodiments, a bracket can support objects between studs of a building. A first telescoping member can include a first rail, a second rail, and a first side body that connects the first rail to the second rail. The first side body can include a first mounting flange with a first mounting opening to receive a first fastener to secure the first telescoping member to a first stud, and a pivot tab that extends from the first mounting flange and includes a pivot opening to receive a second fastener to secure the first telescoping member to the first stud. A second telescoping member can include a third rail, a fourth rail, and a second side body that connects the third rail to the fourth rail, the second side body defining a shoulder and including a second mounting flange with a second mounting opening to receive a third fastener to secure the second telescoping member to a second stud that is spaced apart from the first stud. The first telescoping member can telescopically engage the second telescoping member to provide a range of between-stud lengths for the bracket, with the first rail slidingly engaging the third rail and the fourth rail slidingly engaging the second rail to define an interior area. The pivot tab can extend from the first mounting flange so that the bracket is pivotable about the pivot opening, when the second fastener secures the first telescoping member to the first stud. The bracket can pivot about the pivot opening between an installation orientation and a support orientation. In the installation orientation, the shoulder of the second side body can be seated on a floor track that spans the first and second studs, to define an installation height for the bracket. In the support orientation the first mounting opening can be aligned to be secured to the first stud with the first fastener and the second mounting opening can be aligned to be secured to the second stud with the third fastener, with the bracket at the installation height.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 3A is front elevation view of the bracket of FIG. 1 in a telescoping bracket system, staged in an installation orientation for installation between studs;

FIG. 3B is an enlarged front elevation of a pivot tab of the bracket of FIG. 1, with the telescoping bracket system in the installation orientation of FIG. 3A;

FIG. 4A is side elevation view of the bracket of FIG. 1 staged with the telescoping bracket system in the installation orientation of FIG. 3A;

FIG. 4B is an enlarged side elevation of a shoulder of the bracket of FIG. 1, with the bracket oriented as shown in FIG. 4A;

DETAILED DESCRIPTION

Figure 1:
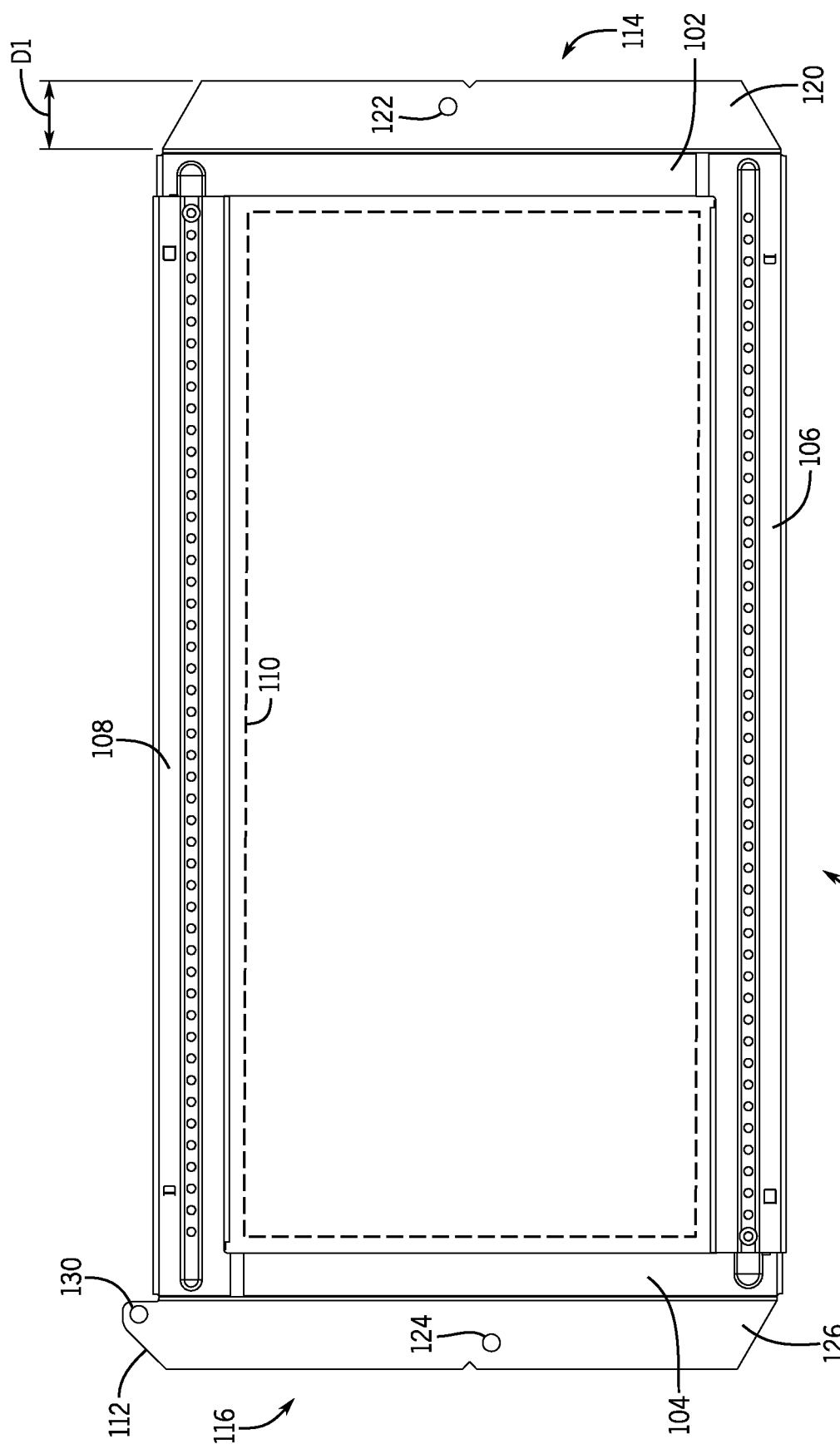
FIG. 1 is a front elevation view of a between-stud bracket according to an embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

The discussion herein is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, between-stud brackets can be used to support electrical boxes or other components between studs (e.g., between standard-size metal studs). In some installations, building codes or other considerations may require that electrical boxes or other components be supported at least a particular height above a floor. Further, in some cases, installation processes may be generally improved if all electrical boxes (or other components) are supported at a common height above the floor.

Conventional between-stud brackets can help to align the brackets at a predetermined height above a floor. However, conventional designs may be unwieldy to use, may require a large number of fasteners for secure installation, or may tend to become caught or bound on studs or floor tracks that extend between studs, among other shortcomings.

Embodiments of the disclosed invention can provide improvements over conventional between-stud brackets, including by providing brackets with auto-height systems that are easy to use, can be secured with only two or three fasteners, and do not tend to catch or bind on building structures. In some embodiments, a pivot tab can extend from a mounting flange of a telescoping bracket to support the telescoping bracket for pivotal movement relative to a stud (e.g., a standard commercial stud with a width of 1.25").

Figure 5:
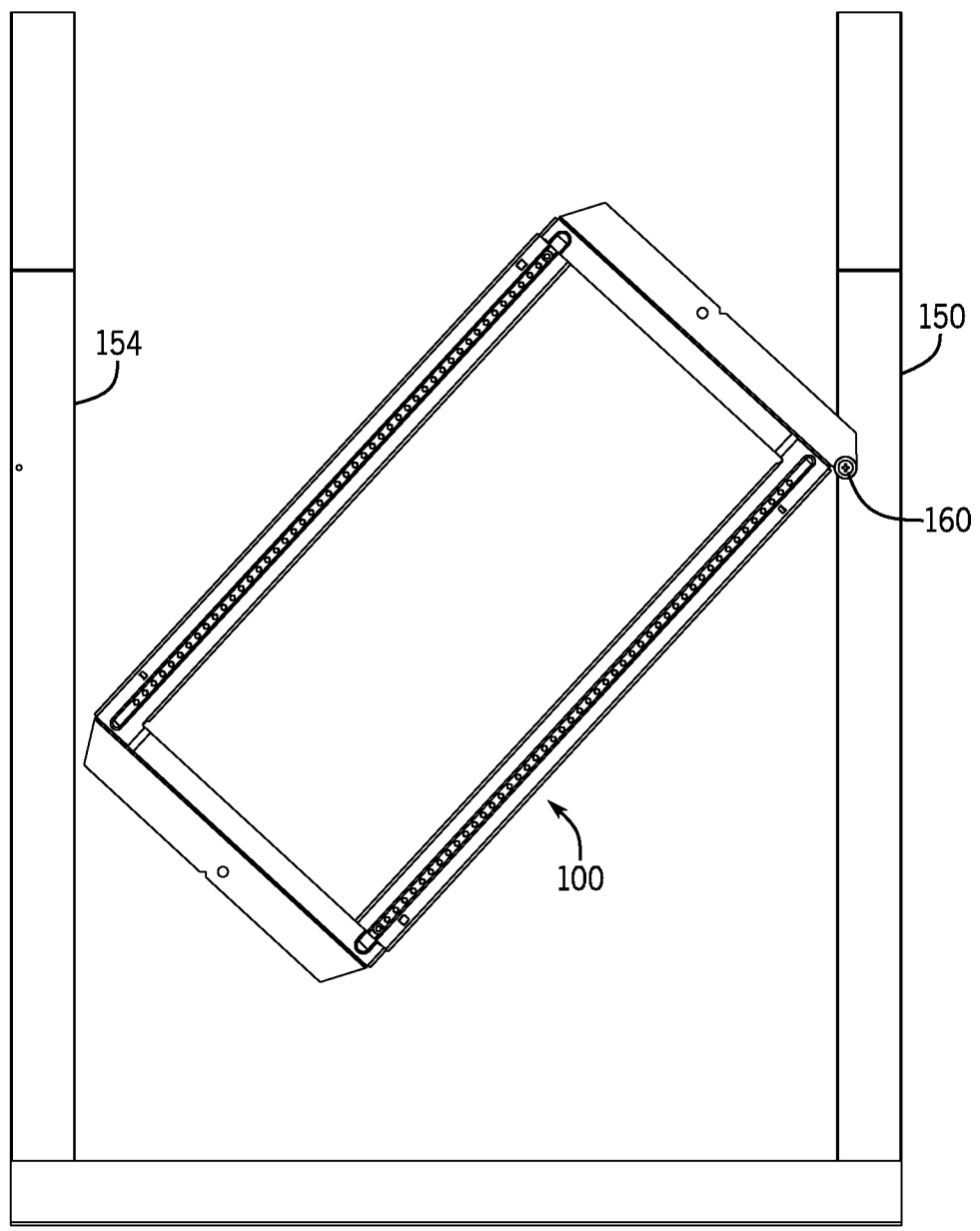
FIG. 5 is front elevation view of the telescoping bracket system of FIG. 3A being pivoted from the installation orientation of FIGS. 3A-4B toward a support orientation during installation between studs.

In some embodiments, a pivot tab and associated mounting flanges to secure a bracket to studs can be coplanar, so that the bracket can more reliably pivot between orientations without the tabs catching on edges of a stud. In some embodiments, other aspects of the geometry of the mounting flanges can further prevent portions of the mounting flange from catching on edges of a stud during installation, or from catching on a floor during rotation of the bracket. For example, mounting flanges can define a trapezoidal profile that tapers inwardly as a distance from a body of the bracket increases. Thus, when the bracket is swung into position (e.g., as shown in FIG. 5) a corner of the flange does not extend from the flange to catch on the floor or on the stud, before the body of the bracket is appropriately aligned. In some embodiments, a pivot tab can be oriented to facilitate easy installation (e.g., can be oriented at the top right of a bracket during staging, from the perspective of a user, and at a bottom right of the bracket once the bracket is installed).

As another example, some embodiments can be formed that do not include protruding tabs that are not substantially coplanar with a corresponding mounting flange. For example, some brackets can include a substantially planar mounting flange with a substantially planar pivot tab extending therefrom, but may not include any tabs or other formations at a periphery of the mounting flanges that protrude out of the reference plane of the mounting flange.

In some embodiments, a shoulder on a bracket can be configured to rest on a top surface of a floor track (e.g., a standard commercial track with a height of 1.25") to define a predetermined installation height without contacting the floor or an underside of the floor track. This arrangement of a shoulder, particularly in combination with a pivot tab configured as disclosed herein, can further assist users in quick and snag-free installation. For example, seating the shoulder of a bracket on a floor track, as opposed to the potentially debris-filled floor of a work site, can allow users to more easily and reliably ensure that the bracket is staged at an appropriate height during installation. Further, the shoulder can help to support the bracket for installation of a pivot screw into a stud, to further ensure the repeatability of a pre-determined height for this pivoting connection point.

Correspondingly, in some cases, a mounting flange at one end of a bracket (e.g., to engage a first stud) can be not co-planar with a mounting flange at another end of the bracket (e.g., to engage a second stud across a stud cavity from the first stud). For example, a reference plane of a substantially planar first mounting flange can be offset from a reference plane of a substantially planar second mounting flange in a direction that extends out of a stud cavity (with the bracket installed in the stud cavity). Thus, for example, when the bracket is staged in an installation orientation (e.g., to assist in securing a pivot tab), the outward offset of the first mounting flange can allow the first mounting flange to overlay a floor track that is installed over the front of the relevant studs without requiring the bracket to be notably deformed or tilted. This arrangement, in turn, can thus assist users in more accurately placing a pivot fastener to then pivot the bracket to a support orientation at a desired height.

In this regard, further benefits can also accrue from the absence of protruding tabs as noted above. For example, contact between protruding tabs and a front face of a stud structure during staging operations can cause a bracket to bend or otherwise become angled relative to vertical. This misalignment can result in corresponding lack of precision with regard to any initial fastener connection (e.g., for pivoting or final support), with corresponding loss of reliability for horizontal installation of the bracket at a pre-defined installation height.

FIG. 1 illustrates an example between-stud bracket 100 for supporting objects between studs of a building. In the embodiment shown, the bracket 100 is formed from two telescoping members 114, 116 (see FIGS. 2A and 2B, in particular), which include respective side bodies 102, 104 connected telescopically by sets of rails 106, 108. In some cases, telescoping members can be substantially identical, which may, for example, reduce manufacturing steps necessary to produce dissimilar parts, generate material savings in the manufacturing process, and simplify packaging and transportation of telescoping members. In some cases, telescoping members can be substantially identical except for a limited number of features (e.g., a pivot tab, as further discussed below). In some cases, a telescoping member can be formed as an integral component (e.g., as formed in a single piece using stamping operations on a metal blank).

Generally, electrical boxes, and other components may be installed in an interior area 110 defined by the perimeter of the side bodies 102, 104 and the sets of rails 106, 108. The side body 102 includes a mounting flange 120 with a mounting opening 122, and the side body 104 includes a mounting flange 126 with a mounting opening 124. The mounting openings 122, 124 are vertically offset from each other and from a horizontal centerline of the bracket 100 in the example shown (i.e., not vertically centered relative to the interior area 110), and can be rotationally symmetric in this regard in some cases.

The mounting flanges can be shaped to prevent corners of the flanges from catching on a floor or on edges of studs during installation, and can further be shaped to provide ease of manufacturing. For example, as shown in FIG. 1, each of the mounting flanges 120, 126 can define a trapezoidal shape. As illustrated, a proximal side of each of the mounting flanges 120, 126 that is most proximate to the interior area 110 can be longer than a distal side of the corresponding mounting flange 120, 126 most distant from the interior area 110, and the distal side and the proximal side can be parallel. Thus, lateral sides of the mounting flanges 120, 126 can angle inwardly from the proximal side to the distal side, which can reduce a probability that a corner of the respective mounting flange 120, 126 catches on a floor, a stud or, or another object during installation. Further, this configuration can provide ease of manufacturing, as lateral sides of the respective mounting flanges 120, 126 can be cut at identical angles relative to either or both of the proximate and distal sides, and manufacturing steps (e.g., shifting, rotating, or repositioning side bodies 102, 104) can be reduced.

As further shown in FIG. 1, the trapezoidal profile of mounting flange 120 can be substantially centered relative to side body 102, while the trapezoidal profile of mounting flange 126 can be offset relative to side body 104, so that a portion of the mounting flange 126 extends outwardly from the bracket 100 in an elongate direction of the mounting flange past the rail 108. The portion of the mounting flange 126 (e.g., the mounting flange comprising a trapezoid that is offset relative to the side body 104) that extends outwardly can comprise a pivot tab 112, as further described below. The proximal side and the distal side of each of the mounting flanges 120, 126 can be centered relative to each other, so that lateral sides of the trapezoids defined by each of the mounting flanges 120, 126 can be substantially identically dimensioned (e.g., a length and angle of opposite lateral sides of a trapezoidal mounting flange can be identical within a margin of error).

FIGS. 4A and 4B illustrate a side elevation view of the bracket 100 in an installation orientation (e.g., a vertical or substantially vertical orientation, as shown). As shown in FIGS. 4A and 4B, mounting flanges 120, 126 extend out in a plane from a front (mounting) surface of the bracket 100 that extends along the sets of rails 106, 108, to define a shoulder between each of the side bodies 102, 104 and each of the respective mounting flange 120, 126. The shoulder 127 can be sized and shaped to at least partially receive a portion of a floor track 152 for a stud system when the bracket is in an installation orientation and the side body 102 is resting on a floor track 152. The shoulder 127 can further be sized and shaped to engage a stud (e.g., seat against studs 150, 154 shown in FIG. 7) when the bracket 100 is in a support orientation, as can help to ensure appropriate extension of the bracket 100 relative to a width of a stud cavity and also assist with staging the bracket 100 in a fully-extended horizontal orientation for insertion of a screw into the mounting flange 120.

Figure 7:
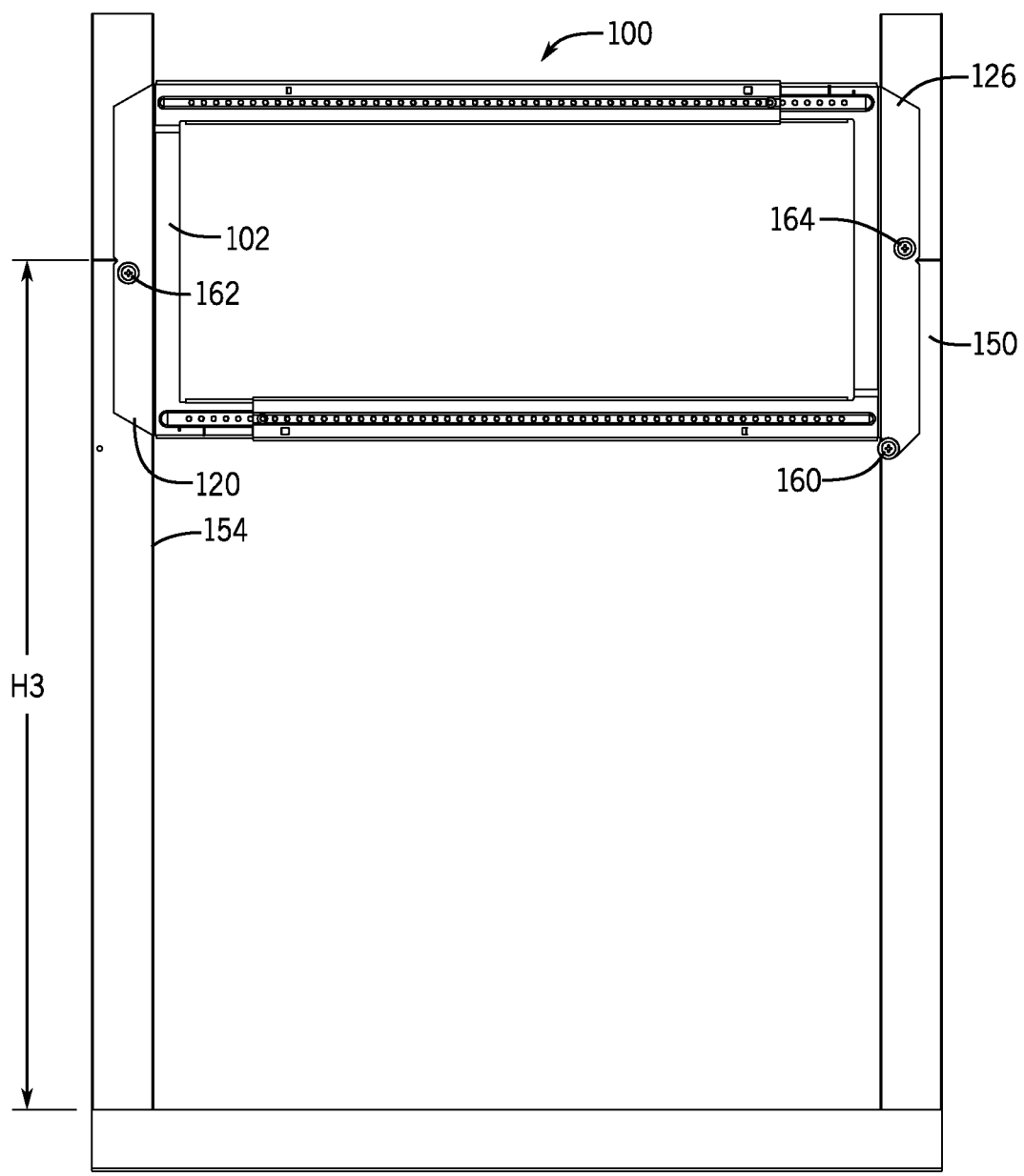
FIG. 7 is front elevation view of the telescoping bracket system of FIG. 3A in an extended-length support orientation, as installed between studs.

In the illustrated example, the internally facing surface of each of the mounting flanges 120, 126 is coincident with the front face of corresponding studs (e.g., studs 150 and 154 shown in FIG. 7) when mounted, with the front surface of the sets of rails 106, 108 offset slightly behind the front face of the stud. As shown in FIGS. 4B and 7 in particular, the mounting flanges 120, 126 extend away from the side bodies 102, 104 by a distance D1 that is smaller than a width of a stud and smaller than a height H1 of the floor track 152 (e.g., by less than 1.25 inches, for standard commercial stud systems). As further discussed below, this arrangement can allow for easier installation than with conventional designs.

Referring back to FIG. 1, the mounting openings 122, 124 allow the bracket 100 to be mounted to studs using fasteners of various types (e.g., self-tapping screws or other threaded or non-threaded fasteners of known types). As illustrated, the mounting openings are substantially centered in the elongate direction of their respective side bodies (e.g., as measured between the exterior edges of rails 106 and 108 and between exterior lateral edges of a mounting flange on which the mounting opening is located), and are also vertically offset relative to each other. This may result in more stable mounting configurations in some cases, including with a relatively small number of fasteners (e.g., no more than two or three fasteners in total).

Figure 2A:
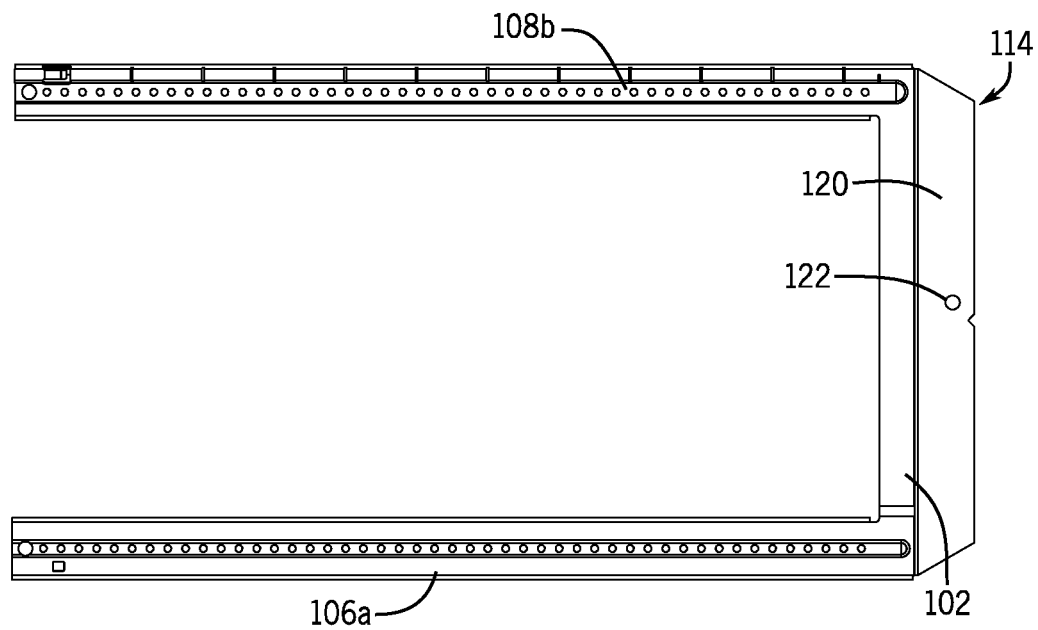
FIG. 2A is a front elevation view of a first telescoping member of the bracket of FIG. 1.
Figure 2B:
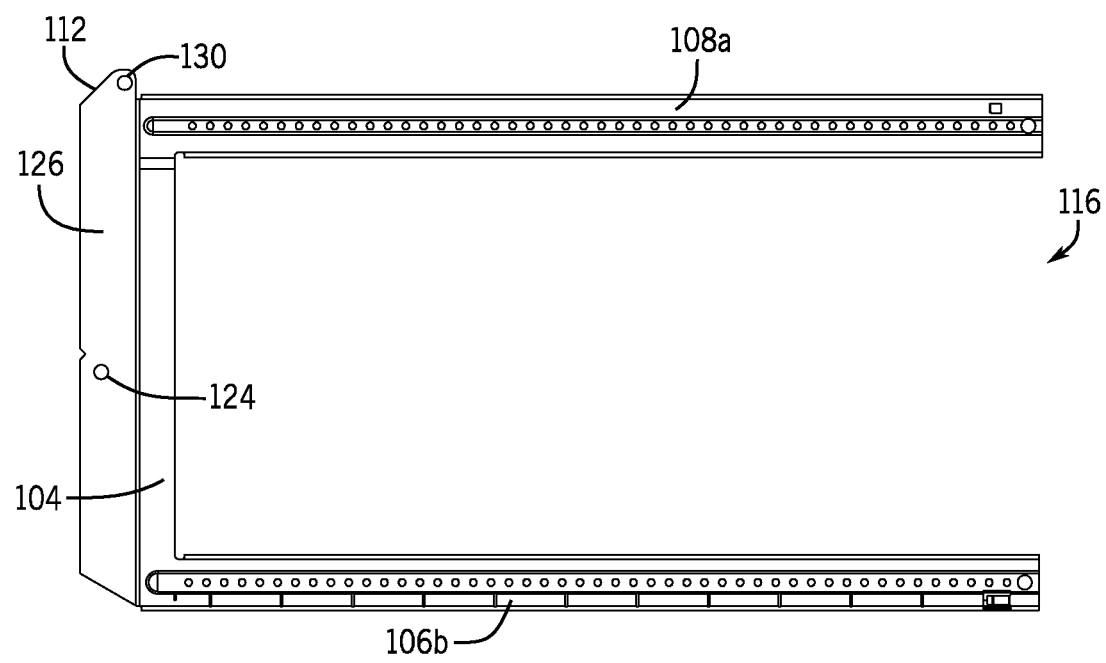
FIG. 2B is a front elevation view of a second telescoping member of the bracket of FIG. 1.

In different examples, different types of telescoping arrangements (e.g., rail profiles) can be used. In the illustrated example, as also noted above, the bracket 100 includes the two telescoping members 114, 116. As shown in FIG. 2A, in particular, the member 114 includes rails 108b, 106a, joined by the side body 102. As shown in FIG. 2B, the member 116 includes rails 108a, 106b, connected by the side body 104. Further, the members 114, 116 are substantially identical (e.g., formed as integrally stamped substantially identical bodies), other than a pivot tab 112 included on the member 116 (e.g., the trapezoidal mounting flange 126 can be offset relative to side body 104 so that the pivot tab 112 overhangs the side body 104). The pivot tab 112 integrally extends outward in the elongate direction from the mounting flange 126, away from the interior area 110, and includes a pivot tab opening 130 which may be used in fastening the bracket 100 to a stud (e.g., stud 150 illustrated in FIG. 5) for installation. In particular, when a support system with the bracket 100 is in the support orientation, the pivot tab 112 is arranged to extend to be vertically below the set of rails 108 (i.e., extend to a lower height than the lower rails of the set of rails 108).

Generally, the rails 106a, 106b, 108a, 108b are sized to engage each other as sets of telescoping rails to provide telescoping adjustability for the bracket 100. While FIG. 1 shows a system with two sets of telescoping rails, some embodiments could vary in this regard.

Figure 8:
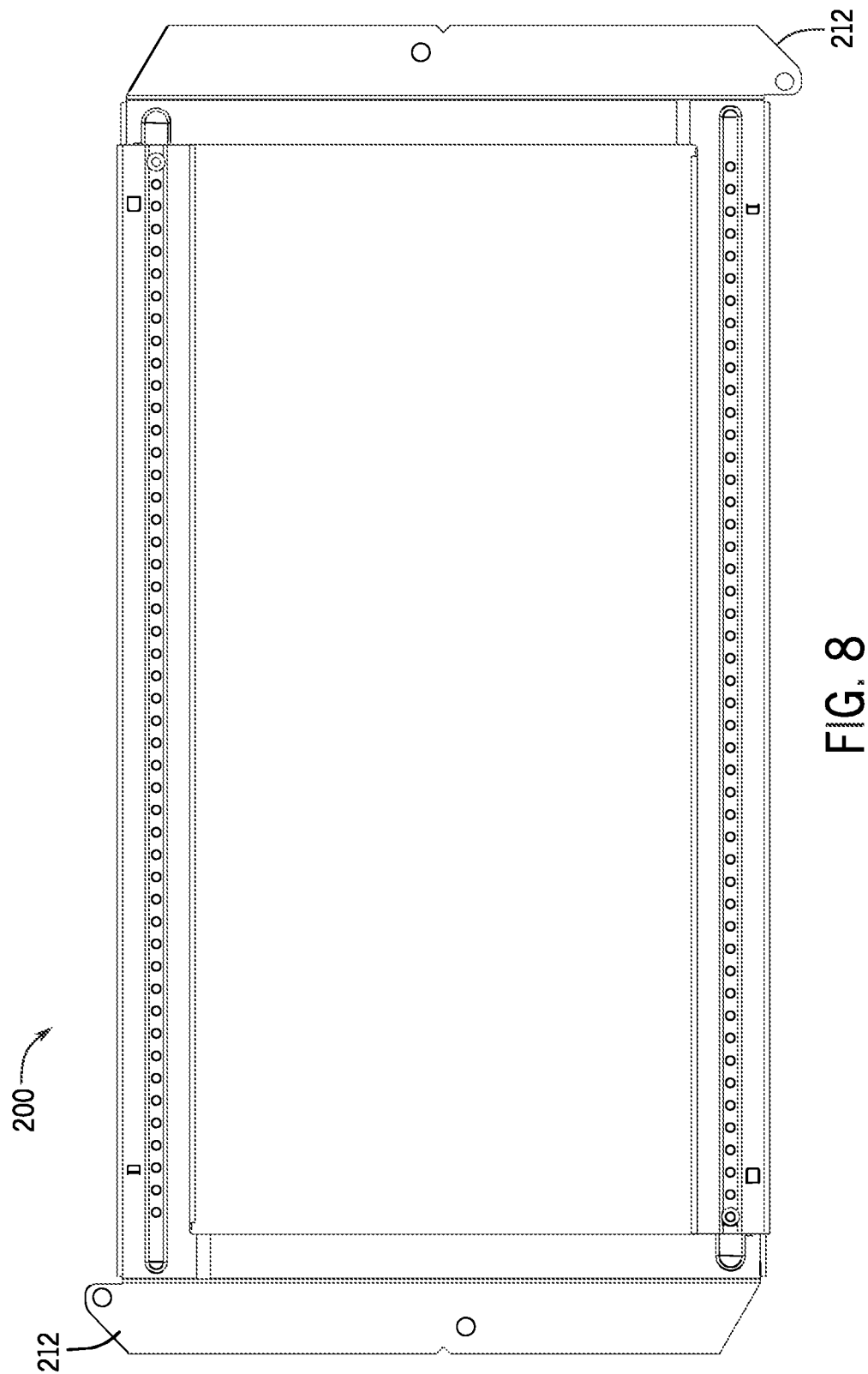
FIG. 8 is a front elevation view of a between-stud bracket according to an embodiment of the invention.

Further, as illustrated in FIGS. 2A and 2B, the rails 106a, 108a can have a larger cross-sectional profile than the rails 106b, 108b, enabling the rail 106a to slidingly receive the rail 106*b*, and enabling the rail 108*a* to slidingly receive the rail 108*b*. Thus, the pivot tab 112 is arranged on the member 114 adjacent to the larger-profile rail 108*a*. In particular, this arrangement may allow for more economical manufacturing of the bracket 100, including with regard to the substantially identical configuration of the members 114, 116 (other than the pivot tab 112). However, other configurations are possible, including configurations with one or more pivot tabs located adjacent to other rails. For example, as shown in FIG. 8, a bracket 200 can include two pivot tabs 212, each configured similarly to the pivot tab 112 (e.g., with each of the bracket members of the bracket 200 being thus having substantially identical configurations, including relative to the tabs 212).

As shown in FIG. 1, when the members 114, 116 are telescopically joined, the side bodies 102, 104 are positioned opposite each other, and are both spaced apart and connected by the sets of rails 106, 108. The members 114, 116 are telescopically joined when the rail 106*b* is slidingly received into the rail 106*a* to form the telescoping set of rails 106, and the rail 108*b* is slidingly received into the rail 108*a* to form the telescoping set of rails 108. This arrangement allows the rails to extend telescopically to span a range of stud-lengths, while still strongly supporting one or more electrical boxes or other components between two studs.

As generally noted above, brackets in some embodiments can provide for easier and more reliable installation of brackets at predefined heights, in horizontal and extended orientations. In this regard, for example, FIGS. 3A through 7 illustrate a method of installing the bracket 100.

In FIG. 3A, the bracket 100 is shown in an installation orientation relative to the floor, with the set of rails 108 abutting stud 150, and the shoulder 127 defined by the side body 102 resting on the floor track 152 that spans between the stud 150 and an adjacent stud 154 (see also FIG. 4B). In this configuration, the pivot tab 112 extends outward horizontally, overlying the outward facing surface of the stud 150. In this illustrated arrangement, right-handed installation is easy, as the bracket may be held in place using the left hand while being fastened with the right. However, other configurations are possible, including configurations that allow the pivot tab 112 to extend leftward to overlie the stud to which it is fastened, thus enabling left-handed installation. Generally, the bracket 100 can be manually placed in the installation orientation shown in FIG. 3A without the use of measurement tools, with the set of rails 108 and the shoulder 127 of the side body 102 providing locating features to ensure proper placement of the bracket 100 generally. Further, the bracket 100 can be thus arranged using a variety of orders of operations, including: first resting the shoulder 127 on the floor track 152 and then sliding the bracket 100 along the floor track 152 toward the stud 150; or first abutting the set of rails 108 against the stud 150 and then sliding the bracket 100 along the stud 150 toward the floor track 152. In some embodiments, the trapezoidal shape of the mounting flange 120 can ensure that no portion of the mounting flange 120 extends from the side body 102 by a distance greater than the height H1 of the floor track 152 with the bracket 100 oriented at any angle when the shoulder 127 is resting on a top surface of the floor track 152. For example, if the mounting flange defined a rectangular profile, a corner of the flange could extend downwardly at a distance from a side body that is greater than the height of a floor track, and thus, differently shaped mounting flanges (e.g., with protruding peripheral features) could catch on a floor or other building structure (e.g. floor tracks) during rotation.

As shown in FIGS. 4A and 4B, when the bracket 100 is in the installation orientation, the mounting flange 120 is coincident with and overlies the forward surface of the floor track 152. Further as also noted above, the mounting flange 120 extends only partially down the height of floor track 152, without reaching the floor (e.g., the distance D1 is less than the height of the floor track H1). In this position, the weight of the bracket prevents telescopic extension of rails 106 and 108 and thus the fully-compressed (or other) height between the pivot tab 112 and the shoulder 127 of the side body 102 can repeatably and automatically locate the pivot opening 130 at a fixed installation height H2 relative to floor track 152. Additionally, FIGS. 4A and 4B illustrate in particular the offset of the mounting flange 120 relative to the mounting flange 120, in a direction perpendicular to the plane of the stud cavity (i.e., to the right in the illustrated example). As also discussed above, and shown in FIG. 4A in particular, this arrangement can help to accommodate the offset of the floor track 152 relative to the studs 150, 154 (see also FIG. 5) while preserving a vertical (or substantially vertical) orientation of the bracket 100 in the illustrated installation orientation.

Figure 6:
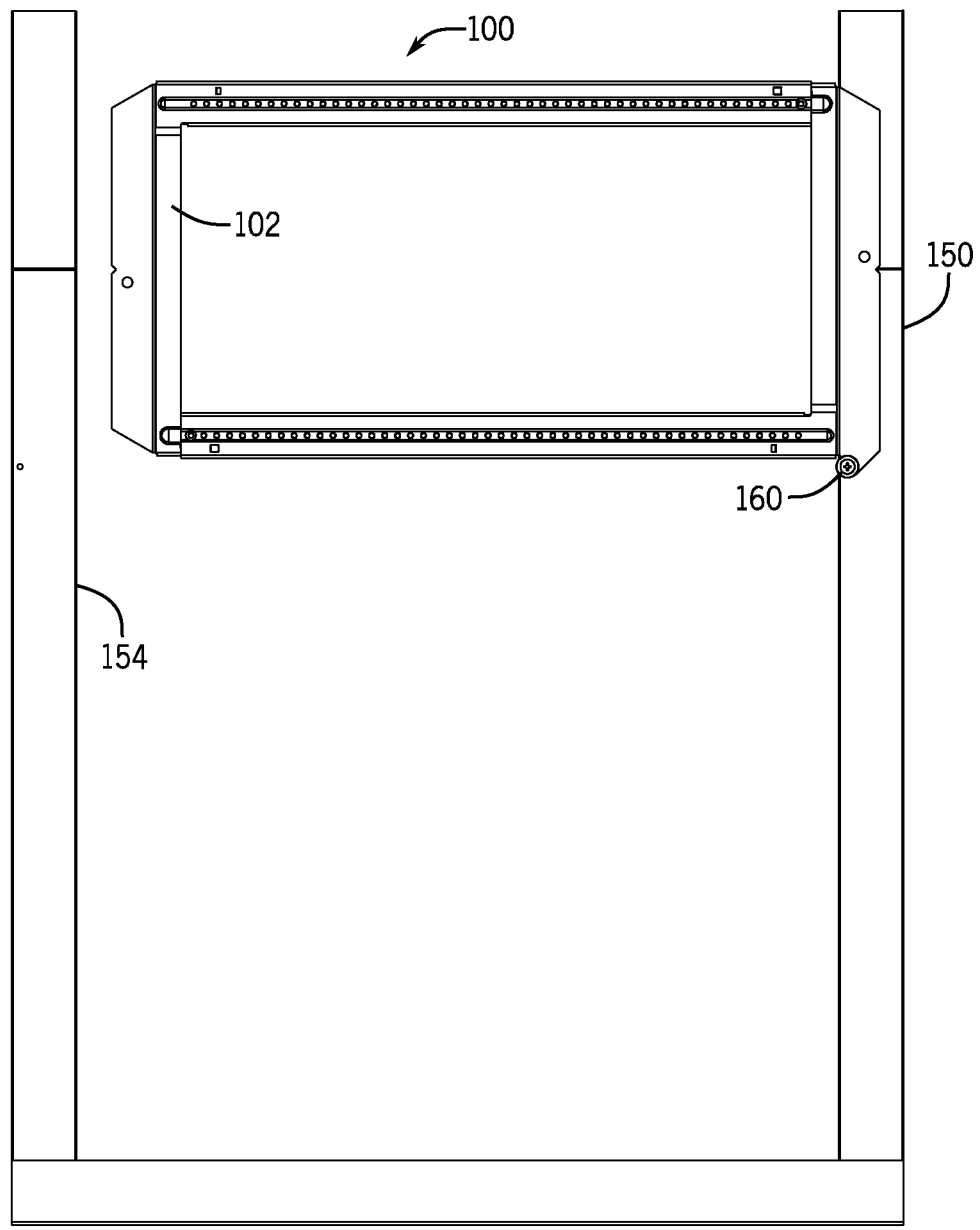
FIG. 6 is a front elevation view of the bracket of FIG. 1 with the telescoping bracket system in the support orientation of FIG. 5.

For a particular compressed length of the bracket 100 and height H1 of the floor track 152, the pivot tab 112 can be fastened to the stud 150 at the installation height H2, which can, in turn allow the bracket 100 to be reliably vertically centered (or substantially centered) about a mounting height H3 when the bracket is in a support orientation (e.g., when the bracket 100 is rotated about the pivot tab 112 to be installed in a horizontal or substantially horizontal orientation, as shown in FIGS. 5-7). In some embodiments, the mounting height H3 can be 17.25 inches (e.g., 17.25 inches above the floor track 152). In some embodiments, then, the bracket 100 can be sized and dimensioned to account for the height H1 of the floor track (e.g., 1.25 inches) to install the bracket 100 at a mounting height H3 (e.g., 17.25 inches) above the floor track, which in turn mounts the bracket at about 18.5 inches from a floor (e.g., the bracket is centered at a height that is the sum of H3 and H1 above the floor). In some embodiments, the fully-compressed height H2 (e.g., from the shoulder 127 to the pivot opening 130) can be about 13.6 inches. In some embodiments, a bracket can be otherwise dimensioned to achieve other mounting heights (e.g., a mounting height of about 15 inches, 16 inches, 18 inches, 19 inches, 20 inches, or 21 inches).

Once the bracket 100 is appropriately aligned for an installation orientation of a bracket system, as shown in FIG. 3B, a fastener 160 can be used to connect the pivot tab 112 to the stud 150 through the pivot opening 130. As illustrated in FIGS. 5 and 6, this allows bracket 100 to pivotally rotate about fastener 160 in a substantially planar fashion from an installation to a support orientation. In particular, the substantially planar configuration and absence of protruding peripheral tabs or corners from the mounting flange 120 supports free rotation of bracket 100 about the pivot opening 130, without risk of catching the bracket 100 on the floor rail or studs during rotation and without the need to deform the bracket 100 to clear obstacles. Relatedly, the relatively short extension length of the mounting flange 120, and the trapezoidal shape of the mounting flange 120 also helps to ensure that the bracket 100 can rotate freely, without risk of catching the mounting flange 120 on the floor. For example, the trapezoidal shape as shown in particular can reduce the chance of catching a stud with an edge of the bracket 100 (e.g., due to bent corners protruding from the mounting flange 120).

With the bracket secured to the stud 150 by the fastener 160, the bracket 100 can be rotated from the installation (e.g., vertical) to the support (e.g., horizontal) orientation, as illustrated in FIGS. 6 and 7. From this position (or at other times), the bracket 100 can be telescopically extended to span the stud length between the stud 150, 154, as illustrated in FIG. 7. Once extended, the side body 102 abuts the stud 154 and the mounting flange 120 overlies the stud 154, coincident with the front surface of stud 154. As also shown in FIG. 7, a fastener 162 can then be used to secure the bracket 100 to the stud 154 through the fastener opening 122 in the mounting flange 120. The embodiment in FIG. 7 also illustrates a fastener 164 securing the mounting flange 126 to the stud 150 through fastener opening 124, providing additional stability to the installation. Other configurations are possible, however, and fastener 164 may be omitted.

In the illustrated embodiment, the bracket 100 thus requires a minimum of two, and a maximum of three fasteners to secure the bracket to the studs 150, 154. This can provide an improvement over conventional designs, which typically require a minimum of three, and a maximum of 4 screws for installation. The reduction in fastening hardware necessarily diminishes both material and labor costs as compared with conventional designs. Additionally, the positioning of the fastening openings 122 and 124 to be substantially centered on side bodies 102 and 104 provides a benefit in stability over prior art designs, in which fasteners are typically attached at the corners of a bracket.

In this regard, for example, the bracket 100 can be secured to the stud 150 at the pivot opening 130 (e.g., using fastener 160), and can be secured to the stud 154 at mounting opening 122 (e.g., using fastener 162). In this configuration, the bracket 100 can in some cases be reliably secured without the need to fasten the bracket 100 to stud 50 through mounting opening 124 (e.g., using fastener 164). Further, a vertical offset between the pivot opening 130 and the mounting opening 122 can provide greater stability to the bracket over systems that could require the bracket to be secured at opposite corners. The bracket 100 thus provides an improvement over some conventional systems, which can require a mounting bracket to be secured at three corners to achieve similar stability.

In some cases, a fully centered mounting arrangement may not be optimal in general. For example, as shown in FIG. 1, the mounting openings 122, 124 are also vertically offset from each other with the bracket 100 in a support (e.g., horizontal) orientation, with corresponding benefits as similarly discussed above. In particular, as shown in the illustrated example, some embodiments can have neither of the mounting openings 122, 124 vertically centered on the bracket 100 in the support orientation.

In the illustrated example, the fully compressed height H2 of the bracket 100 provides a distance between the pivot tab 112 and the shoulder 127 that seats on the floor track 152 that results in the bracket 100 being pivotable to a support orientation in which the bracket 100 is substantially vertically centered at mounting height H3, which, as discussed above, can be 17.25 inches above a top of the floor track 152, or 18.5 inches above the bottom of the floor track 152. Correspondingly, once carpet, tile, or other finished flooring is installed, the bracket 100 may be substantially vertically centered at least 18 inches above the finished flooring, as may satisfy code requirements in some jurisdictions. In other embodiments or installations, a fully compressed (or other) length of a bracket can allow for a bracket to pivot to different mounting heights for a support orientation, as desired.

Figure 9:
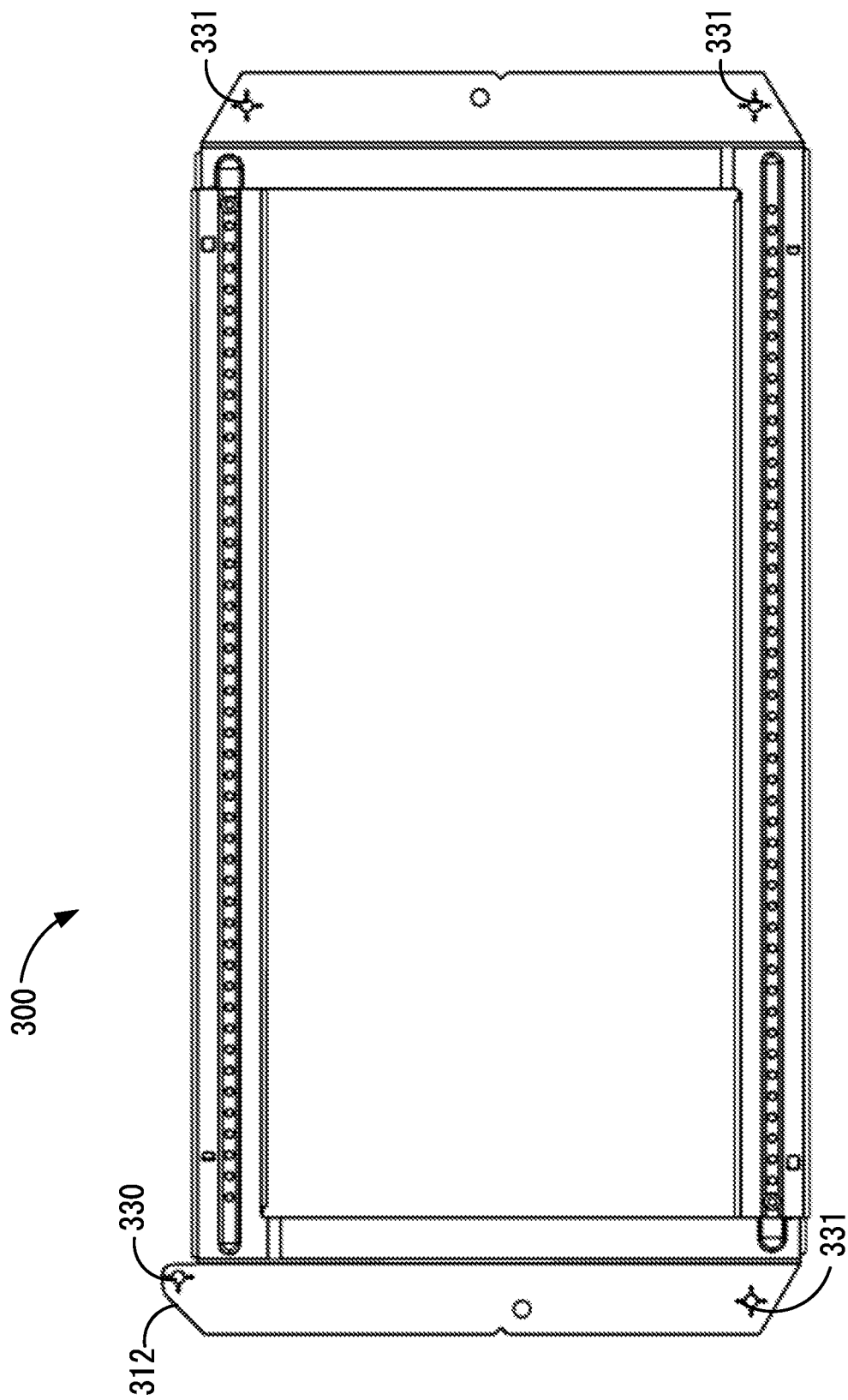
FIG. 9 is a front elevation view of a between-stud bracket according to an embodiment of the invention.

In some cases, it may be beneficial for mounting flanges of a bracket to include only openings that are necessary for mounting the bracket to studs. For example, a user can choose to install the bracket on studs without using the auto-height capabilities, and in this case, the only necessary openings in the mounting flanges for mounting the bracket can be main (e.g., non-pivoting) mounting openings on the relevant mounting flanges. For example, some arrangements of the bracket 100 can include only the mounting openings 122, 124 (e.g., as may be substantially centered along an elongate direction of the respective mounting flanges as shown in FIG. 1). Further in this regard, FIG. 9 illustrates a bracket 300, which, as shown, can include indicators that indicate positions through which fasteners can be placed to secure the bracket 300 to studs. (e.g., visual indicators formed as recessed or embossed markings that are etched or stamped into a surface of mounting flanges of the bracket 300). In some embodiments, similar indicators can be formed on the bracket 100, in place of the illustrated mounting and pivot openings 122, 124, 130, or in other locations on the bracket 100 (e.g., similar to as shown for the bracket 300).

The bracket 300 is generally similar to the bracket 100 and thus discussion of the bracket 100 above also generally applies to the bracket 300, including relative to the disclosed installation operations. In this regard, for example, the bracket can include a pivot tab 312 on a mounting flange and telescoping bracket members that can be used to stage and then fully install the bracket 300 similarly to the bracket 100.

Further, in the illustrated example, a pivot indicator 330 (e.g., a recessed marker stamped into the pivot tab 312) can indicate to an installer a location on the pivot tab 312 at which to place a fastener when using the auto-height functionality of the bracket 300 (e.g., with the bracket staged in an installation orientation as similarly shown in FIG. 3). In some embodiments, installing the bracket 300 can require that a user create an opening in the bracket 300 at the pivot marking and insert a fastener through the pivot opening into a stud. In some embodiments, the fastener can be a self-tapping screw (e.g., like the fastener 160 of FIG. 3B), and the user can create the pivot opening at pivot marking 330 by aligning the self-tapping screw with the pivot indicator 330 and then driving the screw through the mounting flange and into a stud positioned behind the flange. In some embodiments, a pivot indicator (e.g., the indicator 330) can indicate the location of a punch-out feature, which can be removed prior to installation of the bracket 300 to create a pivot (or other) opening at the pivot indicator.

In some embodiments, indicators can be used for other potential openings on a bracket. For example, mounting indicators 331 can be located at other positions along mounting flanges of the bracket 300, to mark locations at which fasteners can advantageously be located to secure the bracket 300 to a stud. In some embodiments, as illustrated, the indicators 331 can be positioned at corners of the bracket 300. In some embodiments, also as illustrated, the mounting indicators 331 can be provided at three corners of a bracket, with the pivot indicator 330 similarly located on the pivot tab 312 to indicate a location for a pivot opening or a location for a fourth mounting opening (e.g., if the auto-height functionality is not used). In some cases, of various included openings and indicators, only a pivot opening may be located above or below the rails of a bracket in a horizontal (e.g., support) orientation, including as shown for the pivot indicator 330 relative to other mounting indicators and openings of the bracket 300.

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise limited or defined, "or" indicates a non-exclusive list of components or operations that can be present in any variety of combinations, rather than an exclusive list of components that can be present only as alternatives to each other. For example, a list of "A, B, or C" indicates options of: A; B; C; A and B; A and C; B and C; and A, B, and C. Correspondingly, the term "or" as used herein is intended to indicate exclusive alternatives only when preceded by terms of exclusivity, such as "either," "one of," "only one of," or "exactly one of." For example, a list of "one of A, B, or C" indicates options of: A, but not B and C; B, but not A and C; and C, but not A and B. A list preceded by "one or more" (and variations thereon) and including "or" to separate listed elements indicates options of one or more of any or all of the listed elements. For example, the phrases "one or more of A, B, or C" and "at least one of A, B, or C" indicate options of: one or more A; one or more B; one or more C; one or more A and one or more B; one or more B and one or more C; one or more A and one or more C; and one or more of A, one or more of B, and one or more of C. Similarly, a list preceded by "a plurality of" (and variations thereon) and including "or" to separate listed elements indicates options of multiple instances of any or all of the listed elements. For example, the phrases "a plurality of A, B, or C" and "two or more of A, B, or C" indicate options of: A and B; B and C; A and C; and A, B, and C.

Also as used herein, unless otherwise limited or defined, "substantially planar" indicates that a relevant component extends along a reference geometric plane over at least 95% of an areal extent of the component. For example, a tab is substantially planar if at least 95% of an area of the tab extends along a plane.

Also as used herein, unless otherwise limited or defined, "substantially parallel" indicates a direction that is within ±12 degrees of a reference direction (e.g., within ±6 degrees or ±3 degrees), inclusive. Correspondingly, "substantially vertical" indicates a direction that is substantially parallel to the vertical direction, as defined relative to the reference system (e.g., for a building, relative to a plumb vertical line as can generally correspond to the direction of in-wall studs), with a similarly derived meaning for "substantially horizontal" (relative to the horizontal direction, as can generally correspond to the direction that spaces adjacent in-wall studs apart from each other).

Also as used herein, unless otherwise limited or defined, "substantially identical" indicates that features or components are manufactured using the same processes according to the same design and the same specifications. In some cases, substantially identical features can be geometrically congruent.

Also as used herein, unless otherwise limited or defined, "substantially centered" indicates that a center of a feature or component relative to a reference direction is within 10% of center of another feature or component relative to the reference direction. For example, for a body having a length L relative to a first direction, a feature that is substantially centered on the body along a first direction has a center that is located at a distance of within 0.1*L of a midpoint of the body along the first direction. In contrast, unless otherwise limited or defined, "offset" indicates that a center of a feature or component is not substantially centered on another component.

Also as used herein, unless otherwise limited or defined, "integral" and derivatives thereof (e.g., "integrally") describe elements that are manufactured as a single piece without fasteners, adhesive, or the like to secure separate components together. For example, an element stamped, cast, or otherwise molded as a single-piece component from a single piece of sheet metal or using a single mold, without rivets, screws, or adhesive to hold separately formed pieces together is an integral (and integrally formed) element. In contrast, an element formed from multiple pieces that are separately formed initially then later connected together, is not an integral (or integrally formed) element.

In some implementations, devices or systems disclosed herein can be utilized, manufactured, or installed using methods embodying aspects of the invention. Correspondingly, any description herein of particular features, capabilities, or intended purposes of a device or system is generally intended to include disclosure of a method of using such devices for the intended purposes, of a method of otherwise implementing such capabilities, of a method of manufacturing relevant components of such a device or system (or the device or system as a whole), and of a method of installing disclosed (or otherwise known) components to support such purposes or capabilities Similarly, unless otherwise indicated or limited, discussion herein of any method of manufacturing or using for a particular device or system, including installing the device or system, is intended to inherently include disclosure, as embodiments of the invention, of the utilized features and implemented capabilities of such device or system.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A method of installing a telescoping bracket system to support an object in a stud cavity between a first stud and a second stud, the method comprising:

arranging in an installation orientation a bracket that includes telescoping rails that extend between first and second mounting flanges, wherein in the installation orientation the bracket extends substantially vertically along the first stud and a shoulder of the bracket that is adjacent to the second mounting flange rests on a floor track that extends between the first stud and the second stud;

securing the bracket to the first stud in the installation orientation with a first fastener received through a pivot opening on a pivot tab that extends integrally from the first mounting flange;

with the bracket secured to the first stud at the pivot opening, pivoting the bracket from the installation orientation to a support orientation and extending the telescoping rails so that the bracket extends substantially horizontally to span the stud cavity, with the first mounting flange overlaying the first stud and the second mounting flange overlaying the second stud; and
securing the bracket to the second stud with a second fastener received through the mounting opening.

2. The method of claim 1, further comprising:
with the bracket in the support orientation, securing the bracket to the first stud with a third fastener received through a mounting opening on the first mounting flange;
wherein a maximum of three fasteners are used collectively to secure the bracket to the first and second studs.

3. The method of claim 1, wherein a maximum of two fasteners are used collectively to secure the bracket to the first and second studs.

4. The method of claim 1, wherein, in the installation orientation, the second mounting flange extends along only part of a height of the floor track.

5. The method of claim 1, wherein, in the installation orientation, the bracket is in a fully-compressed configuration.

6. The method of claim 1, wherein securing the bracket to the first stud in the installation orientation includes forming the pivot opening with the first fastener at a pivot indicator.

7. The method of claim 1, wherein each of the first and second mounting flanges is substantially planar relative to a respective reference plane; and
wherein the reference plane of the first mounting flange is perpendicularly offset from the reference plane of the second mounting flange.

8. A telescoping bracket system comprising:
a bracket that includes:
a first mounting flange;
a second mounting flange that includes a mounting opening;
telescoping rails that extend between the first and second mounting flanges; and
a pivot tab that extends integrally from the first mounting flange and includes a pivot opening arranged to secure the bracket to a first stud to be pivotable between a substantially vertical installation orientation of the telescoping bracket system and a substantially horizontal support orientation of the telescoping bracket system;
in an installation orientation, the bracket being secured to the first stud at the pivot opening and extending along the first stud so that a shoulder of the bracket that is adjacent to the second mounting flange rests on a floor track that extends along a floor between the first stud and a second stud; and
in a support orientation, the first mounting flange overlaying the first stud and the second mounting flange overlaying the second stud, with the bracket secured to the first stud at the pivot opening and to the second stud at the mounting opening to span a stud cavity between the first stud and the second stud.

9. The telescoping bracket system of claim 8, wherein the second mounting flange is sized to remain clear of the floor with the telescoping bracket system in the installation orientation.

10. The telescoping bracket system of claim 8, wherein, with the telescoping bracket system in the support orientation, the first mounting flange contacts only one surface of the first stud outside of the stud cavity and the second mounting flange contacts only one surface of the second stud outside of the stud cavity.

11. The telescoping bracket system of claim 8, wherein the first mounting flange includes a first mounting opening and the mounting opening of the second mounting flange is a second mounting opening; and
wherein the first mounting opening is substantially centered on the bracket in an elongate direction of the first mounting flange, and the second mounting opening is substantially centered on the bracket relative to an elongate direction of the second mounting flange.

12. The telescoping bracket system of claim 8, wherein the first and second mounting flanges are substantially planar relative to a corresponding reference plane, and wherein neither of the first or the second mounting flanges include a tab that extends transverse to the corresponding reference plane.

13. The telescoping bracket system of claim 8, wherein the shoulder separates the second mounting flange from the telescoping rails; and
wherein, with the telescoping bracket system in the support orientation: a substantially planar surface of the second mounting flange contacts a front face of the second stud, and no portion of the second mounting flange contacts another face of the second stud.

14. The telescoping bracket system of claim 8, wherein the second mounting flange does not include a pivot tab.

15. A bracket for supporting objects between studs of a building, the bracket comprising:
a first telescoping member that includes a first rail, a second rail, and a first side body that connects the first rail to the second rail, the first side body including: a first mounting flange with a first mounting opening to receive a first fastener to secure the first telescoping member to a first stud, and a pivot tab that extends from the first mounting flange and includes a pivot opening to receive a second fastener to secure the first telescoping member to the first stud;;
a second telescoping member that includes a third rail, a fourth rail, and a second side body that connects the third rail to the fourth rail, the second side body defining a shoulder and including a second mounting flange with a second mounting opening to receive a third fastener to secure the second telescoping member to a second stud that is spaced apart from the first stud;
the first telescoping member telescopically engaging the second telescoping member to provide a range of between-stud lengths for the bracket, with the first rail slidingly engaging the third rail and the fourth rail slidingly engaging the second rail to define an interior area; and
the pivot tab extending from the first mounting flange so that the bracket is pivotable about the pivot opening, when the second fastener secures the first telescoping member to the first stud, between:
an installation orientation in which the shoulder of the second side body is seated on a floor track that spans the first and second studs, to define an installation height for the bracket; and
a support orientation in which the first mounting opening is aligned to be secured to the first stud with the first fastener and the second mounting opening is aligned to be secured to the second stud with the third fastener, with the bracket at the installation height.

16. The bracket of claim 15, wherein the pivot tab and the first mounting flange are substantially planar.

17. The bracket of claim 16, wherein the first mounting flange defines a first trapezoid having a first-flange proximal side that is adjacent to the first side body, and a first-flange distal side that is opposite the first-flange proximal side, the first-flange proximal side being longer than the first-flange distal side; and wherein the second mounting flange defines a second trapezoid having a second-flange proximal side that is adjacent to the second side body, and a second-flange distal side that is opposite the second-flange proximal side, the second-flange proximal side being longer than the second-flange distal side.

18. The bracket of claim 17, wherein the first and second mounting flanges do not include protruding peripheral tabs.

19. The bracket of claim 17, wherein the first and third rails are spaced from the second and fourth rails along a first direction;

wherein the first trapezoid is substantially centered on the bracket in the first direction; and wherein the second trapezoid is offset from center on the bracket relative to the first direction.

20. The bracket of claim 15, wherein the first and second telescoping members are telescopically engaged with the first, second, third, and fourth rails defining an interior area to receive one or more of the objects;

wherein the first rail is slidingly received within the third rail and the fourth rail is slidingly received within the second rail; and wherein the pivot tab extends away from interior area adjacent to the second rail.

\* \* \* \* \*